United States Patent [19]

Iwao et al.

[11] Patent Number: 4,924,479
[45] Date of Patent: May 8, 1990

[54] COMMUNICATION CONTROL SYSTEM

[75] Inventors: Hideki Iwao, Nagoya; Michio Kato, Seto; Shuichi Yamano, Hadano, all of Japan

[73] Assignee: Hitachi, Ltd., Tokyo, Japan

[21] Appl. No.: 83,165

[22] Filed: Aug. 10, 1987

[30] Foreign Application Priority Data

Aug. 12, 1986 [JP] Japan .................. 61-189202

[51] Int. Cl.⁵ .............................. H04B 1/38
[52] U.S. Cl. ......................... 375/7; 370/31
[58] Field of Search ............ 375/7, 8, 40, 36, 121, 375/38; 370/29, 31, 16; 340/825.01, 825.03; 455/8; 178/69 G

[56] References Cited

U.S. PATENT DOCUMENTS

| | | | |
|---|---|---|---|
| 4,154,978 | 5/1979 | Tu | 370/31 |
| 4,214,123 | 7/1980 | Dagnelie | 370/31 |
| 4,385,392 | 5/1983 | Angell et al. | 375/8 |
| 4,419,752 | 12/1983 | Sonnenberger et al. | 370/29 |
| 4,429,384 | 1/1984 | Kaplinsky | 375/36 |
| 4,573,168 | 2/1986 | Henze et al. | 375/36 |
| 4,622,551 | 11/1986 | Kupersmith et al. | 370/31 |
| 4,685,113 | 8/1987 | Hono et al. | 375/7 |
| 4,736,394 | 4/1988 | Giovannelli et al. | 375/121 |

FOREIGN PATENT DOCUMENTS

6036147 9/1980 Japan .
58-24255 2/1983 Japan .

Primary Examiner—Robert L. Griffin
Assistant Examiner—Stephen Chin
Attorney, Agent, or Firm—Antonelli, Terry & Wands

[57] ABSTRACT

A communication control system arranged between a plurality of terminal apparatuses and a host processing unit in order to transmit and receive signals based on an NRZI coding system between them by way of a half duplex communication system, a "0" bit detecting circuit for detecting the "0" bit of a one-bit length is provided in the communication control system and the sending and receiving modes are automatically switched in accordance with the output of this detecting circuit.

7 Claims, 6 Drawing Sheets

COMMUNICATION CONTROL SYSTEM

BACKGROUND OF THE INVENTION

The present invention relates to a communication control system which is located between a plurality of terminal apparatuses and a host processing unit in order to send and receive a signal based on an NRZI coding system between them by way of a half duplex communication system.

Hitherto, in the case of communicating data between a host processing unit and terminal apparatus through a line, a modulator/demodulator (hereinafter, abbreviated to a MODEM) is connected for each of the host processing unit and terminal apparatus. The digital data is converted into analog data by the MODEM and thereafter, the analog data is sent to the line, thereby performing the data communication. On the other hand, in the case of receiving data from the line, the analog data is converted into digital data by the MODEM and thereafter, the digital data is sent to the terminal apparatus or host processing unit. In the case of providing a plurality of terminal apparatuses on the side of the terminal apparatus, there is a method whereby a branch circuit to branch the output on a single host processing unit side into inputs on a plurality of terminal apparatus side is provided in the communication control system and the host processing unit is connected to a plurality of terminal apparatus through the branch circuit. There is also a method, wherein branch circuits as many as terminal apparatuses are prepared, the branch circuits are connected to each other, and each branch circuit is connected to a corresponding terminal apparatus. This method is shown, for example, in JP-A 58-24255, wherein a plurality of the terminal apparatuses are connected to a single MODEM through the branch circuits within a range in which a delay time is permitted.

However, nothing is taught with respect to automatic switching between sending and receiving of data. Therefore, no consideration is made with regard to a realization of a high switching speed between the data sending and receiving modes.

On the other hand, for example, in JP-B 60-36147, there has been shown a system in which a signal passing through a line is detected to determine whether the line is in the normal or abnormal condition, thereby switching the mode of operation a selected one of a sending mode, receiving mode, or the like. However, in this system, a signal consisting of a predetermined number (i.e., eight bits) of continuous "0" or "1" bits is detected to thereby discriminate the abnormal or normal condition of the signal on a character unit basis, so that it takes a time for such a discrimination and a high mode switching speed cannot be realized.

In particular, in the case of a half duplex communication system, a high response speed is necessary to improve the sending capability. Therefore, it is necessary to make a switching speed between the sending and receiving modes high.

However, in the foregoing conventional technique, no consideration is made with respect to a high switching speed between the sending and receiving modes in the half duplex communication system. There is a problem such that a response time in the data communication through a communication control system arranged between the host processing unit and the terminal apparatus is prolonged.

On the other hand, in the communication system for sending and receiving data by the half duplex communication system through a communication control system arranged between a plurality of host processing units and a plurality of terminal apparatuses, there has been known a method whereby if the existing host processing unit failed, this failure is displayed and the defective host processing unit is manually switched to a stand-by host processing unit. Therefore, it takes time to switch the mode and so a response time for data sending and receiving becomes long. In addition, no problem will occur if the terminal apparatus and the stand-by host processing unit are controlled by the same transmission control procedure; however, when their transmission control procedures differ, the data communication cannot be performed.

SUMMARY OF THE INVENTION

It is the first object of the present invention to provide a communication control system arranged between a host processing unit and a plurality of terminal apparatuses in order to send and receive signals based on the NRZI coding system between them by way of a half duplex communication system, wherein the sending and receiving modes can be automatically switched at a high speed.

It is the second object of the invention to provide a communication control system arranged between a plurality of host processing units and a plurality of terminal apparatuses in order to send and receive signals therebetween, wherein when an existing host processing unit fails, this defective host processing unit is automatically switched to a stand-by host processing unit, and even when the transmission control procedures of the terminal apparatus and host processing unit differ, data can be communicated between them.

To accomplish the first object, the present inventors have paid attention to a point that the "0" bit continues in the beginning of the data in the signal based on the NRZI coding system. Therefore, a "0" bit detecting circuit for detecting the "0" bit of a one-bit length is provided in the communication control system and the sending and receiving modes are switched in accordance with the output of this detecting circuit.

On the other hand, to accomplish the second object, there are provided: an apparatus to detect a failure of the existing host processing unit; an apparatus to switch the existing host processing unit to a stand-by host processing unit in response to an output of the detecting apparatus; and a protocol conversion logic apparatus. The host processing unit whose transmission control procedure is the same as that of the terminal apparatus is directly connected to the branch circuit. The host processing unit whose transmission control procedure is different from that of the terminal apparatus is connected to the branch circuit through the protocol conversion logic apparatus.

DESCRIPTION OF THE PREFERRED EMBODIMENT

An embodiment of the present invention will be described in detail hereinbelow with reference to the drawings.

Figure 1:
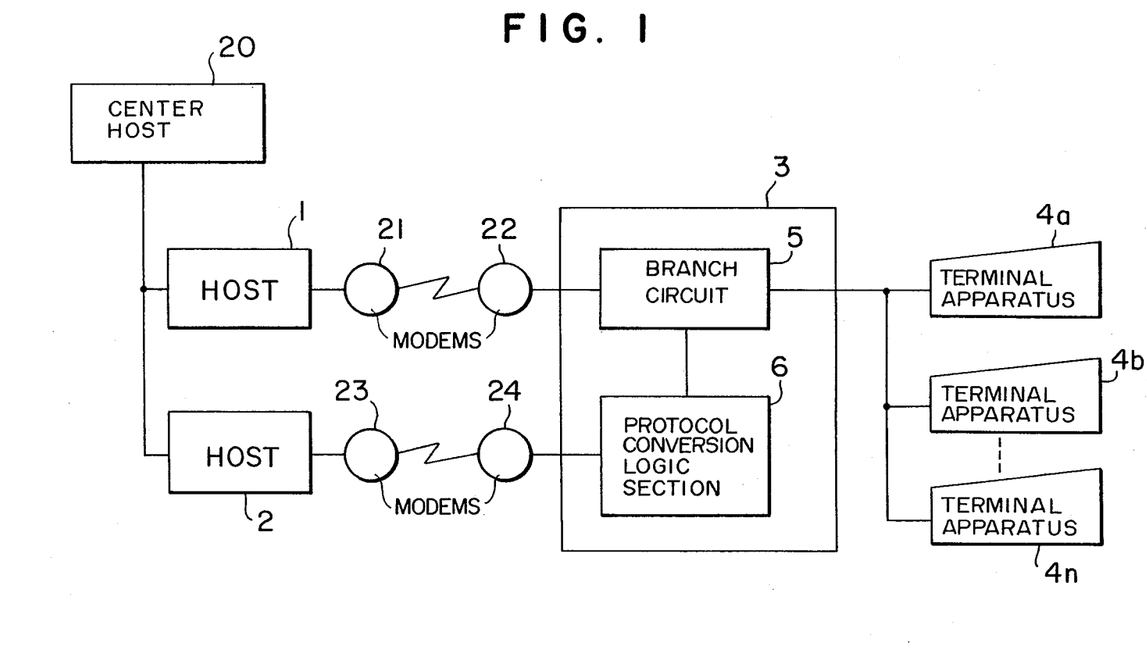
FIG. 1 is a block diagram of a communication control system according to the present invention.

FIG. 1 is a constitutional diagram of a data communication system to which the invention is applied. In this embodiment, it is assumed that, for example, signals based on the NRZI coding system are transmitted and received between terminal apparatuses and host processing units by way of half duplex communication system in accordance with an HDLC procedure.

In FIG. 1, reference numerals 1 and 2 denote host processing units; 3 a communication control system; 4a to 4n terminal apparatuses; 5 a branch circuit; 6 a protocol conversion logic section; and 21 to 24 modulator/demodulator apparatuses (MODEMs). The host processing unit 1 has the same transmission control procedure and transmission rate as those of the terminal apparatus 4. Therefore, the host processing unit 1 is connected to the terminal apparatus 4 through the MODEMs 21 and 22 and branch circuit 5. The transmission control procedure and transmission rate of the host processing unit 2 are different from those of the terminal apparatuses 4a to 4n. Therefore, the host processing unit 2 is connected to the terminal apparatuses 4a to 4n through the MODEMs 23 and 24, protocol conversion logic section 6, and branch circuit 5. The terminal apparatuses 4a to 4n communicate data with either one of the host processing units 1 and 2. When one of these host processing units failed or the like, the defective host processing unit is switched to the other host processing unit by the branch circuit 5, thereby continuing a data communication.

A failure of the host processing unit is detected by a center host processing unit 20. The center host processing unit 20 gives a switching signal to the host processing units 1 and 2. The host processing unit 2 supplies the switching signal to the protocol conversion logic section 6 through the MODEMs 23 and 24, thereby controlling a selecting circuit in the branch circuit 5 as will be explained hereinafter.

Although two host processing units have been used in the embodiment for simplicity of explanation, three or more host processing units may be also used.

In the case of the data communication system as mentioned above, in the data communication between the host processing unit 1 and the terminal apparatuses 4a to 4n in which the protocol conversion is not required, a high processing speed equal to that of the direct-coupling system without using the communication control system 3 is required.

Figure 2:
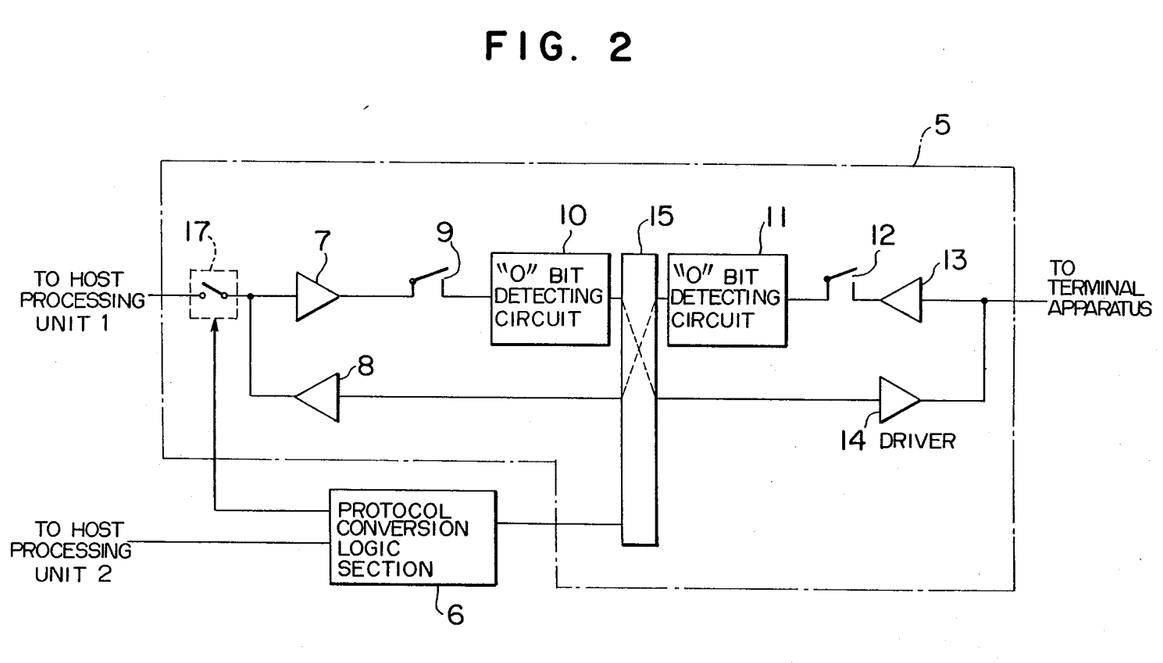
FIG. 2, is a constitutional diagram of a branch circuit in FIG. 1.

FIG. 2 is a constitutional diagram of the branch circuit 5 in the embodiment of the invention and shows a detailed diagram of the branch circuit 5 in FIG. 1.

In FIG. 2, reference numerals 7 and 13 denote receiver circuits; 8 a driver circuit; 9 a switching circuit on the side of the host processing unit; 10 a "0" bit detecting circuit, arranged on the side of the host processing unit, for detecting a "0" bit signal of a one-bit length; 11 a "0" bit detecting circuit, arranged on the side of the terminal apparatus, for detecting a "0" bit signal of a one-bit length; 12 a switching circuit arranged on the side of the terminal apparatus; and 15 a MODEM section.

A transmission path for transmitting a signal from the host processing unit 1 to the terminal apparatuses is formed by the receiver circuit 7, switching circuit 9, "0" bit detecting circuit 10, MODEM section 15, and a driver 14. A transmission path for transmitting signals from the terminal apparatuses to the host processing unit 1 is formed by the receiver circuit 13, switching circuit 12, "0" bit detecting circuit 11, MODEM section 15, and driver circuit 8.

A selecting circuit 17 is preferably a switch and selectively connects the branch circuit 5 to the host processing unit 1 in response to an output of the protocol conversion logic section 6.

In the embodiment, only a single host processing unit has been connected to the branch circuit 5. However, it is also possible to connect a plurality of host processing units with the branch circuit 5 and to selectively connect the branch circuit 5 with one of the host processing units by the selecting circuit 17.

The protocol conversion logic section 6 is connected to the MODEM section 15 of the branch circuit 5.

The operation of the branch circuit in the case of the data transmission without need of the protocol conversion will now be described hereinbelow with reference to FIGS. 1 and 2.

Namely, the operation in the case of communicating data between the host processing unit 1 and the terminal apparatuses 4a to 4n through the branch circuit 5 will now be described.

In this case, the switch of the selecting circuit 17 is closed.

First, a signal from the host processing unit 1 is received by the receiver circuit 7 through the selecting circuit 17 connected with the "0" bit detecting circuit 10 through the switching circuit 9. Although the switching circuit 9 is set to the "ON" state in the initial state, it is set to the "OFF" state when the "0" bit is detected in the signal from the terminal apparatus by the "0" bit detecting circuit 11.

On the other hand, the signal from the terminal apparatus is received by the receiver circuit 13 and connected to the "0" bit detecting circuit 11 through the switching circuit 12. Although the switching circuit 12 is set to the "ON" state in the initial state, it is set to the "OFF" state when the "0" bit is detected in the signal from the host processing unit 1 by the "0" bit detecting circuit 10.

In the data communication due to the NRZI coding system, the signal level is set to "1" when no data is sent. When data is sent, "0" bit continues in the first portion of the data. Therefore, in the embodiment, when the "0" bit detecting circuit of one of the transmission paths detects the "0" bit, the switching circuit of the other transmission path is turned off.

Namely, when data/command is sent from the host processing unit to the terminal apparatus, the signal is received by the receiver circuit 7 and input to the "0" bit detecting circuit 10 through the switching circuit 9. For the period of time when the "0" bit in a series of bit train of the reception data exists, the switching circuit 12 is held in the "OFF" state by the control of the "0" bit detecting circuit 10. Thus, the "0" bit detecting circuit 11 does not receive the "0" bit and the switching circuit 9 is held in the "ON" state. Therefore, a unidirectional electrical path from the host processing unit 1 to the terminal apparatus is formed.

The same shall also apply to the case of transmitting data from the terminal apparatus to the host processing unit. For the period of time when the "0" bit in a series of bit train of the reception data exists, the switching circuit 9 is turned off by the "0" bit detecting circuit 11, so that a unidirectional path from the terminal apparatus to the host processing unit 1 is formed.

In the case of the data transmission which needs the protocol conversion, data is protocol converted by the protocol conversion logic section 6 and a data communication is performed through the branch circuit 5.

Figure 3:
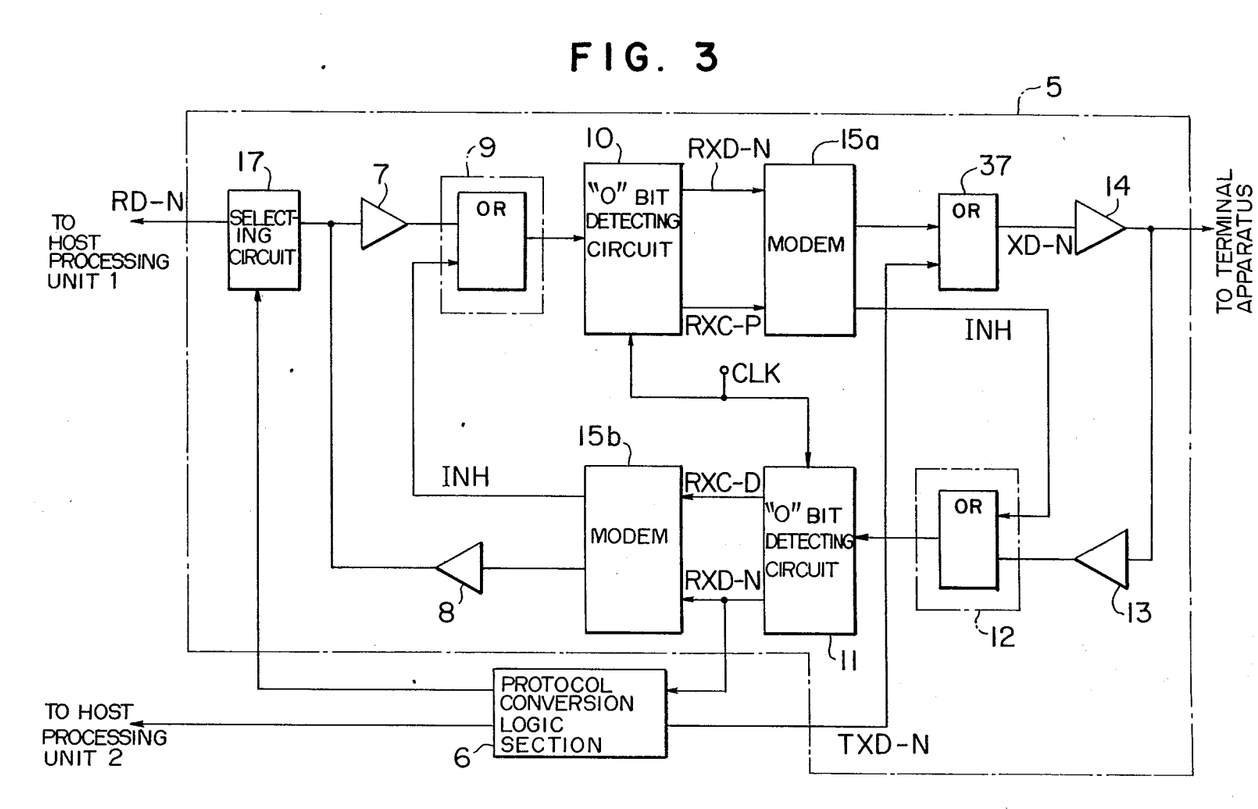
FIG. 3 is a detailed block diagram of the branch circuit shown in FIG. 2.

FIG. 3 is a block diagram showing a constitution of the branch circuit 5 shown in FIG. 2.

A signal RD-N denotes the data to be received by the host processing unit 1. A signal TXD-N indicates the data which is sent from the protocol conversion logic section 6. A signal XD-N denotes the data which is sent to the terminal apparatus.

The MODEM section 15 shown in FIG. 2 has modulator/demodulator circuits (MODEMs) 15a and 15b and an OR gate 37. A transmission path from the host processing unit 1 to the terminal apparatus is formed by the receiver circuit 7, switching circuit 9 (in this case, OR gate), "0" bit detecting circuit 10, MODEM 15a, OR gate 37, and driver 14. A transmission path from the terminal apparatus to the host processing unit 1 is formed by the receiver circuit 13, switching circuit 12 (in this case, OR gate), "0" bit detecting circuit 11, MODEM 15b, and driver circuit 8. When the "0" bit detecting circuit 10 or 11 detects the "0" bit in the received signal, they give an inhibition signal INH of the "1" level to the OR gate 12 or 9 through the MODEM 15a or 15b and set outputs of the OR gate 12 or 9 to "1", respectively. Namely, the switching circuit 12 or 9 is turned off.

On the other hand, a signal from the host processing unit 2 to the terminal apparatus is transmitted through the protocol conversion logic section 6, OR gate 37, and driver 14. In this case, since the host processing unit 1 is disconnected from the branch circuit 5 by the selecting circuit 17 by the output of the protocol conversion logic section 6, the output of the MODEM 15a is set to 0". A signal from the terminal apparatus to the host processing unit 2 is transmitted through the receiver circuit 13, OR gate 12, "0" bit detecting circuit 11, and protocol conversion logic section 6.

Figure 4:
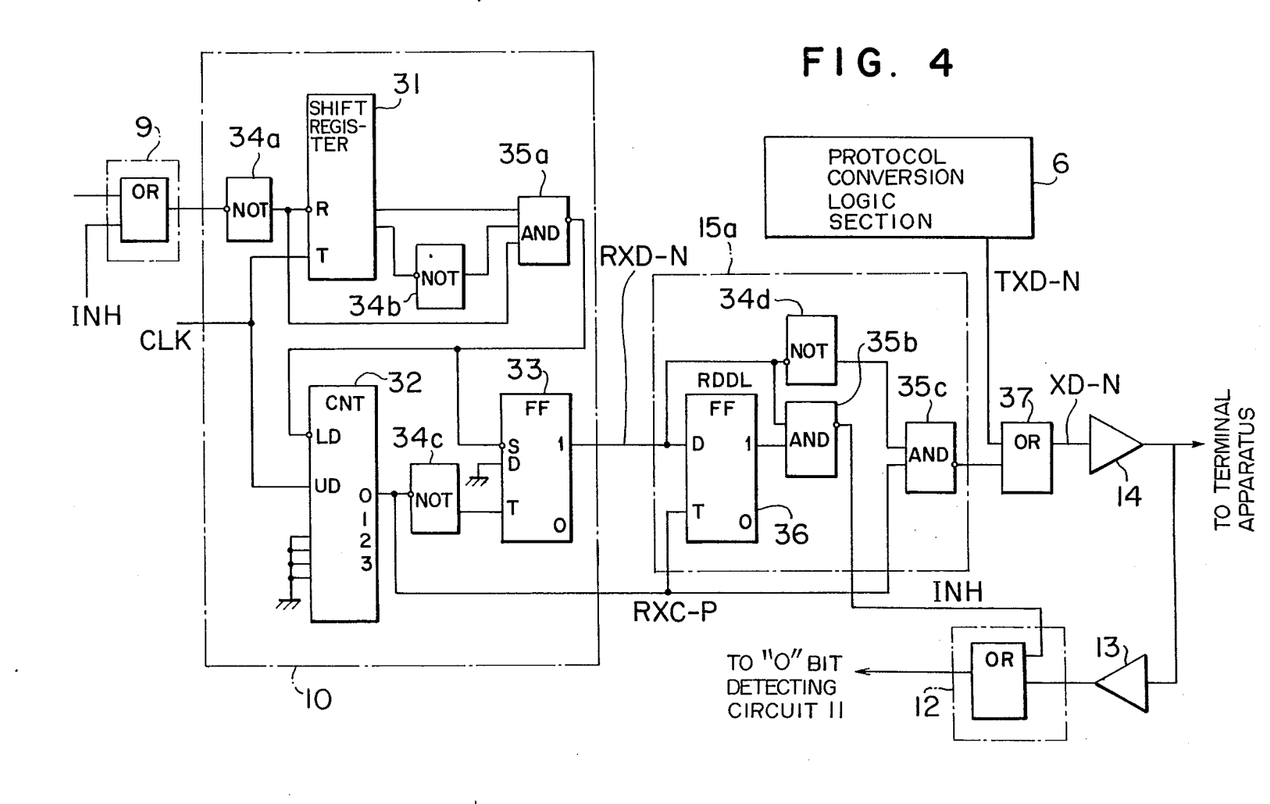
FIG. 4 is a block diagram of a "0" bit detecting circuit and a modulator/demodulator (MODEM) shown in FIG. 3.

FIG. 4 shows a circuit diagram of the "0" bit detecting circuit 10 and MODEM 15a in FIG. 3. The constitutions of the circuits 10 and 15a are the same as those of the "0" bit detecting circuit 11 and MODEM 15b, respectively.

In the diagram, reference numeral 31 denotes a shift register; 32 a counter; 33 a flip-flop; 34a to 34d NOT gates; 35a to 35c AND gates; and 36 a flip-flop.

First, the operation of the "0" bit detecting circuit 10 will be described with reference to FIG. 5.

The circuit of FIG. 4 is the circuit in the case where the communication control system 3 transmits data from the host processing unit 1 to the terminal apparatus.

Figure 5:
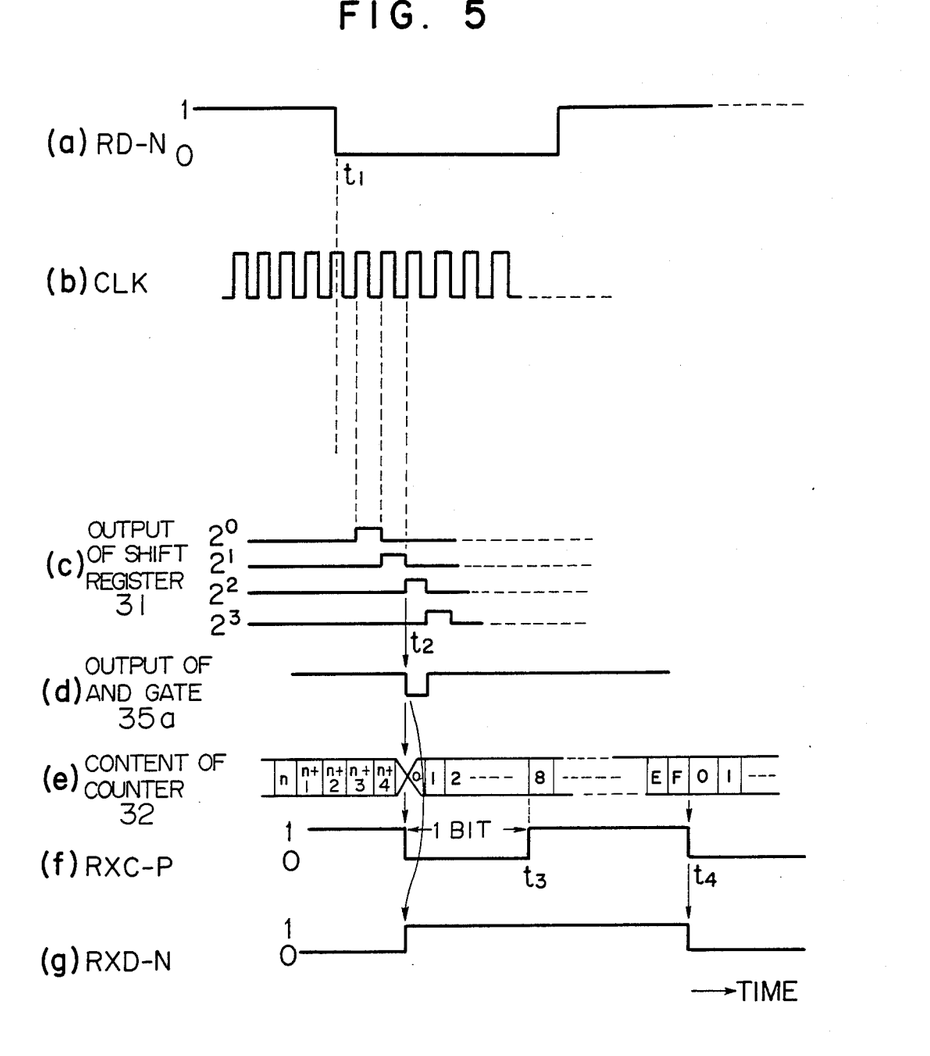
FIG. 5 is a time chart for explaining the operation of the "0" bit detecting circuit in FIG. 4.

When the communication control system 3 receives the RD-N signal (reception data for the NRZI coding) (refer to (a) in FIG. 5) from the host processing unit through the receiver circuit 7 and switching circuit 9, the reception data is input to the "0" bit detecting circuit 10. In the "0" bit detecting circuit 10, the polarity of the reception data RD-N is inverted by the NOR gate 34a. The inverted data is supplied to a reset input R of the shift register 31 and to the AND gate 35a. The shift register 31 is reset at time $t_1$ in response to the "0" bit of the reception data RD-N. Thereafter, the shift register 31 supplies an output pulse to the NOT gate 34b and AND gate 35a in response to a clock signal CLK (refer to (b) in FIG. 5) which is given to a trigger input T. The AND gate 35a receives outputs of the shift register 31 and NOT gates 34a and 34b. After the shift register 31 was reset, the AND gate 35a outputs a pulse (refer to (d) in FIG. 5) at time $t_2$ synchronously with a clock signal of a predetermined number (e.g., the third clock signal). Namely, the AND gate 35a suppresses the noises in the received data. An output pulse of the AND gate 35a is given to a LOAD input of the counter 32 and to a set input S of the flip-flop 33.

The counter 32 is reset by the output pulse of the AND gate 35a and counts the clocks CLK. The counter 32 is, e.g., a hexadecimal counter. For example, the value of $2^3$ bits of the content of 2 is output. Therefore, the output of the counter 32 is set to "0" for the period of time until the eighth clock is input from time $t_2$, i.d., for the interval of time $t_2$ to $t_3$. After the eighth clock was input, the output of the counter 32 is set to "1" until the sixteenth clock is input (for the interval of time $t_3$ to $t_4$). In a manner similar to the above, the output of the counter 32 varies. It is now assumed that one bit of the reception data corresponds to eight clock pulses CLK. Therefore, the output of the counter 32 changes on a one-bit unit basis in response to the output pulse of the AND gate 35a. This output pulse is given to the MODEM 15a as a sampling signal RXC-P (refer to (f) in FIG. 5) and is also supplied to a trigger input T of the flip-flop 33 through the NOT gate 34c.

Therefore, an output of the flip-flop 33 is set to the high level at time $t_2$ by the noise-suppressed reception data from the AND gate 35a and is set to the low level at time $t_4$ synchronously with the trailing edge of the sampling signal RXC-P (refer to (g) in FIG. 5).

As described above, the noise-suppressed reception data is demodulated by the flip-flop 33 and is given as the noise-suppressed demodulated signal RXD-N to the MODEM 15a.

The operation of the MODEM 15a will now be described with reference to a time chart of FIG. 6.

The RXD-N signal is input to the flip flop 36 and synchronized with the sampling signal (RXC-P signal). An RDDL signal (refer to (d) in FIG. 6) is output as reception data at time $t_3$ and input to the AND gate 35b. Therefore, the RDDL signal is the one which is derived by delaying the RXD-N signal by only one bit by the RXC-P signal. On the other hand, the RXD-N signal is also input to the AND gate 35b together with the RDDL signal. The AND of these signals is calculated and the inhibition signal INH (refer to (e) in FIG. 6) of the "1" level is output to the OR gate in the switching circuit 12. Thus, the OR gate inhibits that the sending data from the driver circuit 14 is input to the branch circuit 5 through the receiver circuit 13.

At the same time, it is also inhibited that a signal is input from the terminal apparatus to the branch circuit 5 while the inhibition signal is set to the "1" level, so that the transmission path from the terminal apparatus to the host processing unit 1 is shut off.

The RXD-N signal whose polarity was inverted by the NOT gate 34d and the RXC-P signal are input to the AND gate 35c and the AND of them is calculated. Thus, the signal which is derived by again modulating the RXD-N signal by way of the NRZI coding system with a delay time of one bit is obtained.

Figure 6:
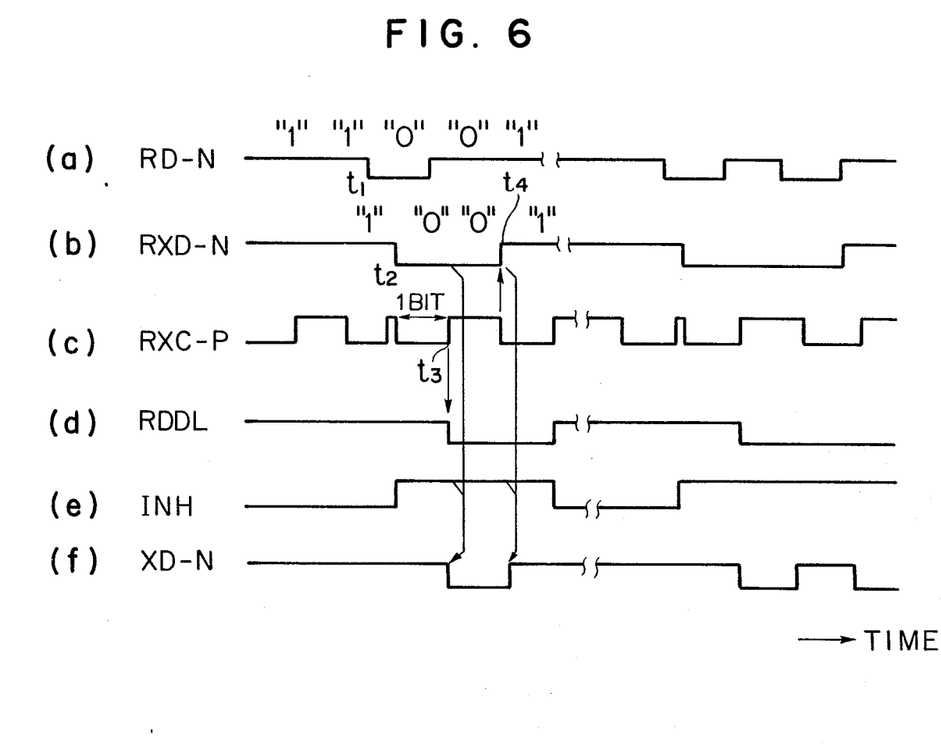
FIG. 6 is a time chart for explaining the operation of the circuit in FIG. 4.

This signal is input to the OR gate 37 and the OR of this signal and the transmission data (TXD-N signal) which is sent from the protocol conversion logic section 6 is calculated and sent as transmission data XD-N (refer to (f) in FIG. 6) to the terminal apparatus through the driver 14.

As described above, the signal is transmitted from the host processing unit 1 to the terminal apparatus. In this case, the TXD-N signal is not input to the OR gate 37.

The signal transmission from the terminal apparatus to the host processing unit 1 is also performed in a manner similar to the above.

In this case, when the transmission control procedures are the same, the transmission data can be directly sent. Therefore, the data transmission rate does not deteriorate.

On the other hand, a data transmission between the host processing unit 2 and the terminal apparatus will now be described. As mentioned above, since the selecting circuit 17 disconnects the branch circuit 5 from the host processing unit 1 in this case, the output of the MODEM 15a is set to the "0" level. The data from the host processing unit 2 is sent as the transmission data TXD-N to the OR gate 37 through the protocol conversion logic section 6. This data is then sent as the transmission data XD-N to the terminal apparatus through the driver 14.

The data from the terminal apparatus is supplied to the "0" bit detecting circuit 11 through the receiver circuit 13 and switching circuit 12. The RXD-N signal is sent to the host processing unit 2 through the protocol conversion logic section 6.

In the present invention, either one of the host processing units 1 and 2 may be ordinarily used and the other may be used as a stand-by unit.

As described above, according to the present invention, a signal delay time in the communication control system interposed between the host processing unit and the terminal apparatuses can be reduced to a time shorter than the time of one-bit length. Thus, the response time in the data communication can be reduced and the deterioration in data communication processing capability can be prevented.

We claim:

1. A communication control system arranged between a plurality of terminal apparatuses and a host processing unit in order to send and receive signals based on a non-return-to-zero inverted (NRZI) coding system between them by way of a half duplex communication system, comprising:

branch means in which one end is connected to the host processing unit by a first signal line and the other end is connected to said plurality of terminal apparatuses through a second signal line;

said branch means having first and second transmission paths connected in parallel between said one end and the other end;

said first transmission path having a first switching circuit to disconnect or connect said first transmission path, a first "0" bit detecting circuit to detect a "0" bit of a one-bit length in the signal which passes through the first transmission path in a direction from said one end to the other end, and a first control circuit to control a second switching circuit of said second transmission path in response to an output of said first "0" bit detecting circuit; and said second transmission path having said second switching circuit to disconnect or connect the second transmission path, a second "0" bit detecting circuit to detect a "0" bit of a one-bit length in the signal which passes through the second transmission path in a direction from the other end to the one end, and a second control circuit to control said first switching circuit in response to an output of said second "0" bit detecting circuit.

2. A system according to claim 1, wherein said first and second control circuits disconnect said second and first switching circuits when said first and second "0" bit detecting circuits detect the "0" bit of the one-bit length, respectively.

3. A communication control system for sending and receiving signals between a plurality of terminal apparatuses and a host processing unit, comprising:

connecting means in which one end is connected to at least one existing host processing unit whose transmission control procedure is the same as those of said plurality of terminal apparatuses by a first signal line, and the other end is connected to said plurality of terminal apparatuses by a second signal line;

transmission control procedure conversion logic means in which one end is connected to at least one stand by host processing unit whose transmission control procedure differs from those of said plurality of terminal apparatuses, the other end is connected to said connecting means, and the transmission control procedure between said second host processing unit and the terminal apparatuses is converted; and means for detecting abnormal states of said at least one existing and said standby host processing units, wherein said abnormal state detecting means sends a switching signal to said logic means through said standby host processing unit when an abnormal state is detected in said at least one existing host processing unit, and said logic means controls said connecting means in response to said switching signal and disconnects said at least one existing host processing unit from said connecting means and connects said standby host processing unit which is in a standby state with the connecting means.

4. A system according to claim 3, wherein when the signals are sent and received between said standby host processing unit and the terminal apparatuses, said logic means sends the input signal from the standby host processing unit to the other end of said connecting means and sends the signal which is input from the other end of said connecting means to said standby host processing unit.

5. A communication control system arranged between a plurality of terminal apparatuses and a host processing unit in order to send and receive signals based on a non-return-to-zero inverted (NRZI) coding system between them by way of a half duplex communication system, comprising:

branch means in which one end is connected to at least one first host processing unit by a first signal line and the other end is connected to said plurality of terminal apparatuses through a second signal line;

said branch means having first and second transmission paths connected in parallel between said one end and the other end;

said first transmission path having a first switching circuit to disconnect or connect said first transmission path, a first "0" bit detecting circuit to detect a "0" bit of a one-bit length in the signal which passes through the first transmission path in a direction from said one end to the other end, and a first control circuit to control a second switching circuit of said second transmission path in response to an output of said first "0" bit detecting circuit;

said second transmission path having said second switching circuit to disconnect or connect said second transmission path, a second "0" bit detecting circuit to detect a "0" bit of a one-bit length in the signal which passes through the second transmission path in a direction from the other end to the one end, and a second control circuit to control said first switching circuit in response to an output of said second "0" bit detecting circuit;

said branch means being connected such that said one end is connected to said at least one first host processing unit whose transmission control procedure is the same as those of said plurality of terminal apparatuses by said first signal line, and the other end is connected to said plurality of terminal apparatuses by said second signal line;

transmission control procedure conversion logic means, in which one end is connected to at least one second host processing unit whose transmission control procedure differs from those of said plurality of terminal apparatuses, the other end is connected to said branch means, for converting the transmission control procedure between said second host processing unit and the terminal apparatus;

means for detecting abnormal states of said first and second host processing units, wherein said abnormal state detecting means sends a switching signal to said logic means through said second host processing unit when an abnormal state is detected in an existing one of said first and second host processing units; and said logic means controls said branch means in response to said switching signal and disconnects said existing one of said first and second host processing units from said branch means and connects a standby host processing unit of said first and second host processing units being in a standby state with said branch means.

6. A system according to claim 5, wherein said first and second control circuits disconnect said second and first switching circuits when said first and second "0" bit detecting circuits detect the "0" bit of the one-bit length, respectively.

7. A system according to claim 6, wherein when the signals are sent and received between said second host processing unit and the terminal apparatuses, said logic means sends the input signal from the second host processing unit to the other end of said branch means and sends the signal which is input from the other end of said branch means to said second host processing unit.

* * * * *